United States Patent
Kurtenbach et al.

(10) Patent No.: US 9,395,886 B2
(45) Date of Patent: Jul. 19, 2016

(54) REPRESENTING GEOLOGICAL OBJECTS SPECIFIED THROUGH TIME IN A SPATIAL GEOLOGY MODELING FRAMEWORK

(71) Applicant: Schlumberger Technology Corporation, Sugar Land, TX (US)

(72) Inventors: Ben Kurtenbach, Nettetal (DE); Martin Neumaier, Herzogenrath (DE); Stefan Steden, Hannover (DE); Nicola Tessen, Aachen (DE)

(73) Assignee: Schlumberger Technology Corporation, Sugar Land, TX (US)

(*) Notice: Subject to any disclaimer, the term of this patent is extended or adjusted under 35 U.S.C. 154(b) by 105 days.

(21) Appl. No.: 13/937,479

(22) Filed: Jul. 9, 2013

(65) Prior Publication Data

US 2013/0298065 A1 Nov. 7, 2013

Related U.S. Application Data

(63) Continuation of application No. 13/271,984, filed on Oct. 12, 2011, now Pat. No. 8,483,852.

(51) Int. Cl.
| | | |
|---|---|---|
| *G06F 3/00* | (2006.01) | |
| *G06F 3/0484* | (2013.01) | |
| *G01V 99/00* | (2009.01) | |
| *G01V 1/34* | (2006.01) | |

(52) U.S. Cl.
CPC ............ *G06F 3/0484* (2013.01); *G01V 99/005* (2013.01); *G01V 1/345* (2013.01)

(58) Field of Classification Search
None
See application file for complete search history.

(56) References Cited

U.S. PATENT DOCUMENTS

| | | |
|---|---|---|
| 4,821,242 A | 4/1989 | Hennington |
| 6,853,922 B2 | 2/2005 | Stark |
| 7,769,545 B2 | 8/2010 | Lomask et al. |
| 7,769,546 B2 | 8/2010 | Lomask et al. |
| 7,986,319 B2 | 7/2011 | Dommisse et al. |
| 2005/0171698 A1 | 8/2005 | Sung et al. |
| 2007/0276604 A1 | 11/2007 | Williams et al. |
| 2008/0140319 A1 | 6/2008 | Monsen et al. |
| 2008/0235628 A1 | 9/2008 | Faught |
| 2008/0243749 A1 | 10/2008 | Pepper et al. |
| 2009/0204331 A1 | 8/2009 | Lomask et al. |
| 2009/0204332 A1 | 8/2009 | Lomask et al. |
| 2010/0149917 A1 | 6/2010 | Imhof et al. |
| 2011/0002194 A1 | 1/2011 | Imhof et al. |
| 2011/0066405 A1 | 3/2011 | Chartrand et al. |
| 2011/0161133 A1 | 6/2011 | Staveley et al. |
| 2011/0313667 A1 | 12/2011 | Levin |
| 2011/0320182 A1 | 12/2011 | Dommisse et al. |
| 2012/0029827 A1 | 2/2012 | Pepper et al. |
| 2012/0029828 A1 | 2/2012 | Pepper et al. |

OTHER PUBLICATIONS

Combined Search and Examination Report issued in GB1218266.3 on Jan. 16, 2013, 6 pages.
Magoon, et al., "The Petroleum System—From Source to Trap: AAPG Memoir 60", AAPG/Datapages, 1994, pp. 3-24.

*Primary Examiner* — Christopher E Everett
(74) *Attorney, Agent, or Firm* — Alec J. McGinn

(57) ABSTRACT

A method can include providing a geological time data structure configured to link objects of a reservoir model to geological times; linking one of the objects of the reservoir model to one of the geological times; generating simulation results for the reservoir model; and, based at least in part on the geological time data structure, outputting at least some of the simulation results along a geological time axis. Various other apparatuses, systems, methods, etc., are also disclosed.

20 Claims, 11 Drawing Sheets

REPRESENTING GEOLOGICAL OBJECTS SPECIFIED THROUGH TIME IN A SPATIAL GEOLOGY MODELING FRAMEWORK

CROSS REFERENCE TO RELATED

This application is a continuation of U.S. patent application Ser. No. 13/271,984 filed Oct. 12, 2011, which is incorporated herein by reference in its entirety.

BACKGROUND

Geological models may be employed to assist with resource assessment and recovery. A typical geological modeling process includes acquisition of seismic data for a geological site and analysis of the seismic data to construct a model of the site. Given a model, an engineer may make assessments as to a subterranean resource at the site and may generate model-based simulation data that sheds light on potential recovery of the resource from the site.

Geological models are multidimensional in space (e.g., three-dimensional), correspond to the present time (e.g., time of seismic data acquisition) and allow for simulations that focus on resource recovery to take place over a relatively short period of time compared to geological time. Accordingly, various aspects of geological time may be neglected. In various examples, technologies and techniques may provide for analyses with respect to geological time.

SUMMARY

A method can include providing a geological time data structure configured to link objects of a geological model to geological times. By linking an object of a geological model to a geological time and generating simulation results for the geological model, such a method can provide for outputting simulation results along a geological time axis. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
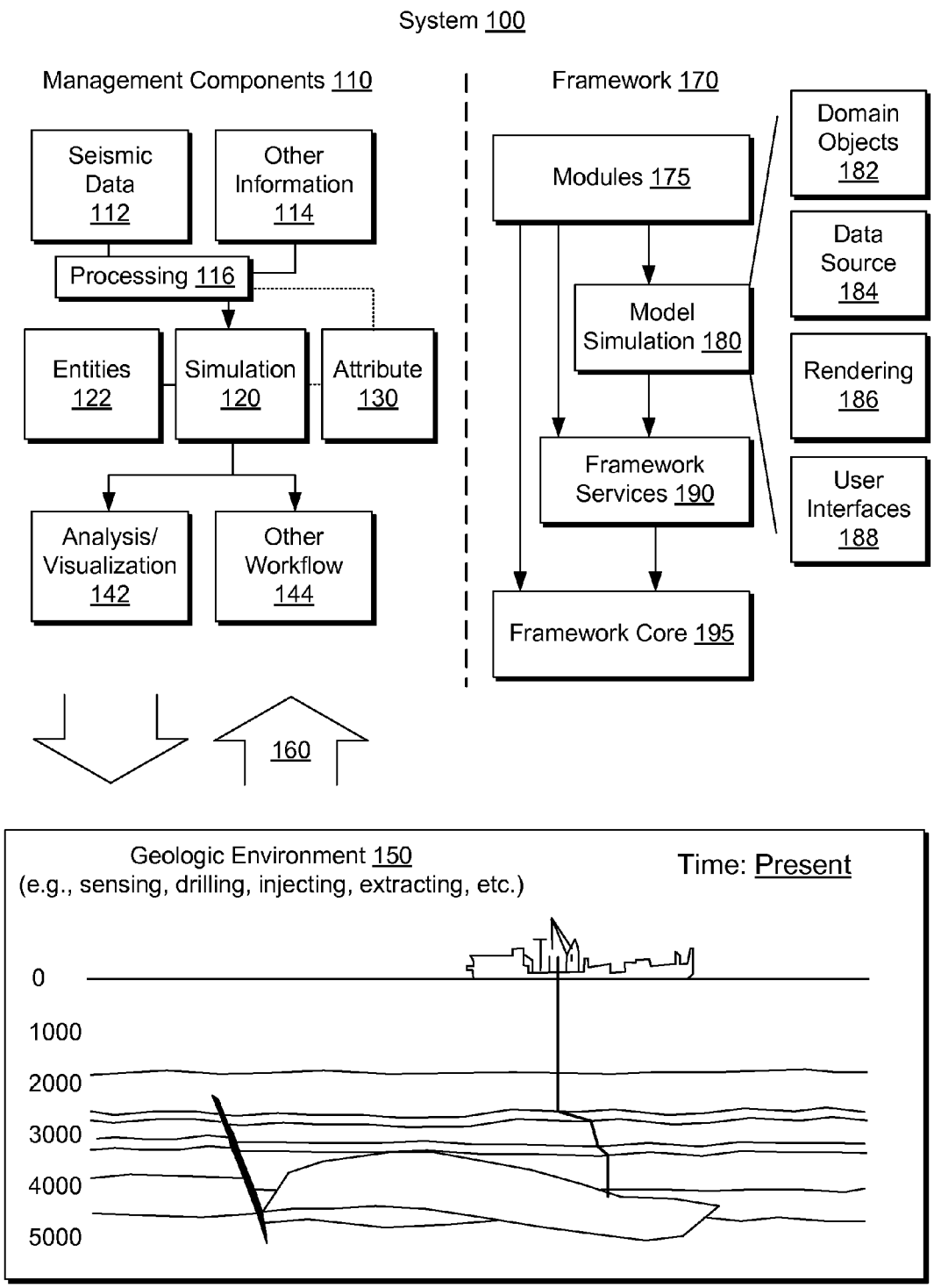
FIG. 1 illustrates an example system that includes various components for simulating a geological environment.

FIG. 1 shows an example of a system 100 that includes various management components 110 to manage various aspects of a geologic environment 150. For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an information component 114, a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114).

In an example embodiment, the simulation component 120 may rely on a software framework such as an object-based framework. In such a framework, entities may include entities based on pre-defined classes to facilitate modeling and simulation. A commercially available example of an object-based framework is the MICROSOFT® .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120. Alternatively, or in addition to, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results. Additionally, or alternatively, output from the simulation component 120 may be input to one or more other workflows, as indicated by a workflow component 144.

In an example embodiment, the management components 110 may include features of a commercially available simulation framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment).

In an example embodiment, the management components 110 may include features for geology and geological modeling to generate high-resolution geological models of reservoir structure and stratigraphy (e.g., classification and estimation, facies modeling, well correlation, surface imaging, structural and fault analysis, well path design, data analysis, fracture modeling, workflow editing, uncertainty and optimization modeling, petrophysical modeling, etc.). Particular features may allow for performance of rapid 2D and 3D seismic interpretation, optionally for integration with geological and engineering tools (e.g., classification and estimation, well path design, seismic interpretation, seismic attribute analysis, seismic sampling, seismic volume rendering, geobody extraction, domain conversion, etc.). As to reservoir engineering, for a generated model, one or more features may allow for simulation workflow to perform streamline simulation, reduce uncertainty and assist in future well planning (e.g., uncertainty analysis and optimization workflow, well path design, advanced gridding and upscaling, history match analysis, etc.). The management components 110 may include features for drilling workflows including well path design, drilling visualization, and real-time model updates (e.g., via real-time data links).

In an example embodiment, various aspects of the management components 110 may include add-ons or plug-ins that operate according to specifications of a framework environment. For example, a commercially available framework environment marketed as the OCEAN® framework environment (Schlumberger Limited) allows for seamless integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application.

The model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

In the example of FIG. 1, the domain objects 182 can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

Figure 2:
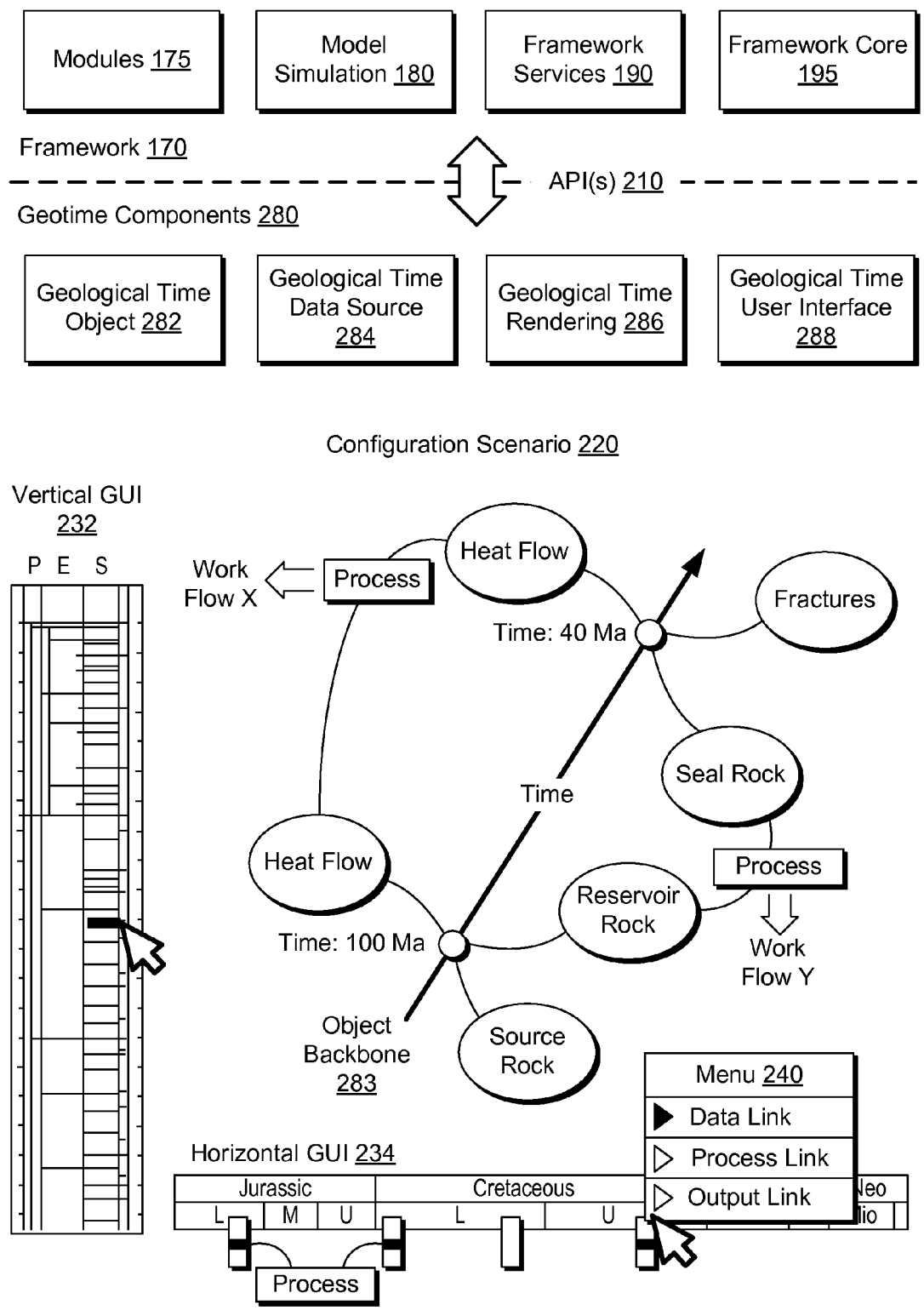
FIG. 2 illustrates an example of a collection of geological time components along with an example of a configuration scenario.

FIG. 2 shows components of the framework 170, geological time components 280 (e.g., "geotime" components), which may interact via one or more application programming interfaces 210 (APIs), as well as an example scenario 220. In the example of FIG. 2, the geotime components 280 include one or more geological time objects or components 282, one or more geological time data source components 284, one or more geological time rendering components 286 and one or more geological time user interface components 288.

In the example scenario 220, a geological time object 282 may be instantiated to provide an object backbone 283 (e.g., a backbone for links to other objects or data). In such an example, the geological time object 282 may be referred to as a geotime backbone object as it may be configured to structure data for purposes of presenting data along a geological time axis.

In the example scenario 220, the object backbone 283 may reference or be based on one or more geological time data sources, which may be provided through one or more geological time data source components 284, and rendered using one or more geological time rendering components 286. For example, a geological time data source component may be configured to access data for a chronographic axis or chart (e.g., with details extending from Period (P) to Epoch (E) to Stage (S)) and then rendered to a display (e.g., a screen, a monitor, etc.). In an example embodiment, a geological time graphic may be an interactive graphical user interface (GUI), for example, implemented by one or more UI components 288.

In the example scenario 220, a vertical GUI 232 or horizontal GUI 234 may be rendered to allow for user interaction, for example, to populate the object backbone 283 via a menu control 240 (e.g., to create links or structure data with respect to one or more geological times). As shown, the object backbone 283 is populated with objects at a time of 100 Ma and with objects at a time of 40 Ma. As indicated, processes may be assigned to objects associated with the object backbone 283, for example, to provide output to one or more workflows (see, e.g., Work Flow X and Work Flow Y).

In an example embodiment, population of an object backbone may occur through linking. In an example embodiment, linking may link entities to inherently link to data (or "data elements"). Linking may involve tagging, for example, where a geological object of a geological model or its associated data can be tagged to indicate a link to one or more geological time objects such as the object associated with the object backbone 283. In an example embodiment, linking and tagging may optionally occur in an essentially simultaneous manner (e.g., where a linking operation automatically causes an object or data to be tagged).

Figure 3:
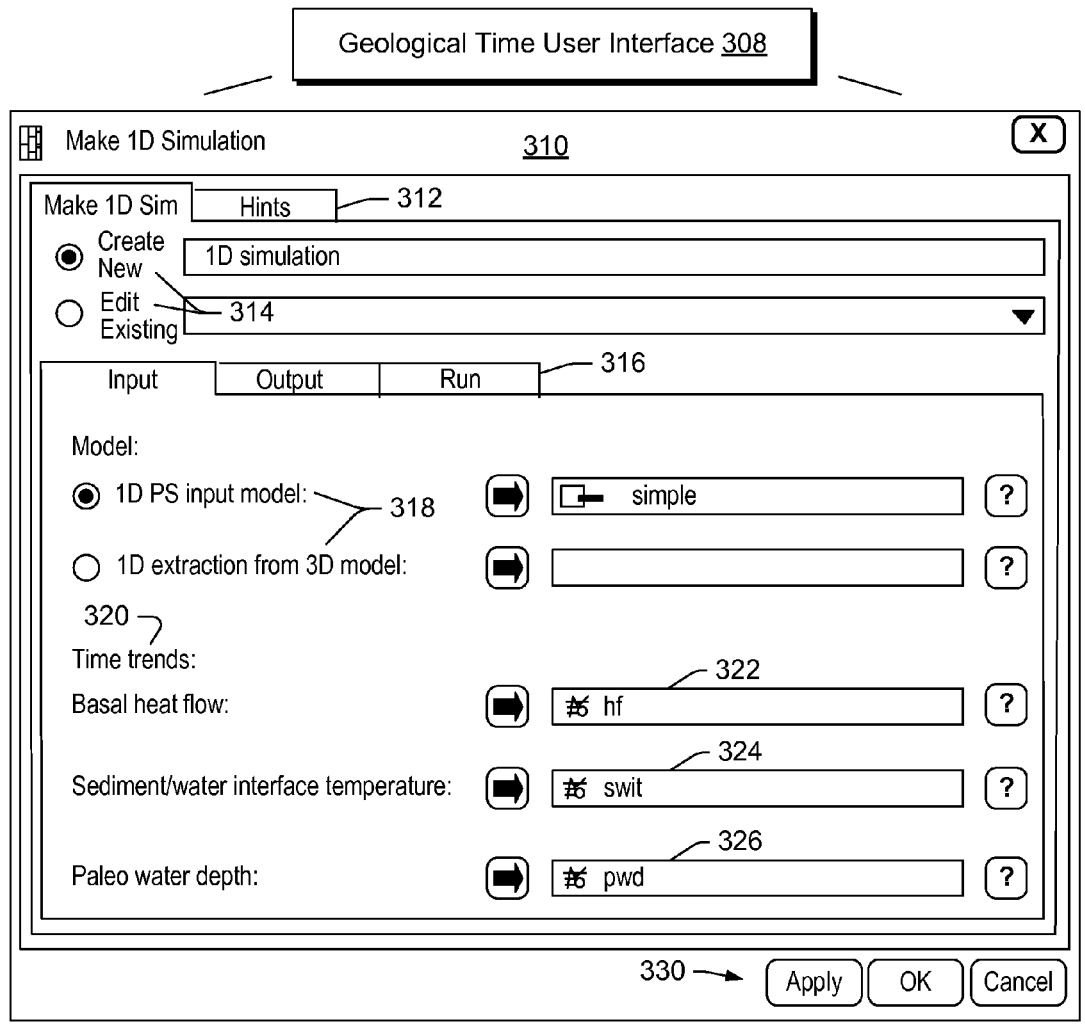
FIG. 3 illustrates an example of a user interface along with an example of a data structure and an example of a method for linking time and spatial information.
Figure 3:
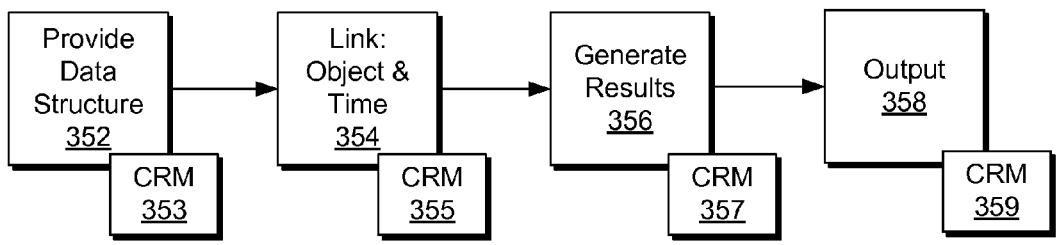

FIG. 3 shows a geological time user interface component 308, for example, configured to provide for rendering of an interface or GUI 310 and also shows an example of a data structure 340 and an example of a method 350. The GUI 310 includes tabs 312 for simulation set up as well as for hints to assist a user. The simulation set up tab includes graphical controls 314 to allow for creating a new simulation and for editing an existing simulation (e.g., a previously run simulation). In the example of FIG. 3, another set of tabs 316 provides for control of input, output and running or execution of instructions to perform a simulation to generate simulation results.

For the input tab, graphical controls 318 allow for model choices while time trends 320 allow for selection of trends that may occur with respect to time. In the example of FIG. 3, the time trends 320 include a basal heat flow trend set up graphic 322, a sediment/water interface temperature set up graphic 324 and a paleo water depth set up graphic 326. Through selection of graphics, a user may set up the various time trends 320 to form input instructions for running a simulation. For example, time trend selection information may be stored in a geological time data structure defined on a geotime backbone accessible by a simulation module to thereby allow for output of simulation results that again include geological time data for association with a geotime backbone. Consider an example scenario where a user selects the "Input" tab from the tabs 316, provides input specifications via the various graphical controls (e.g., 314, 318, 320, 322, 324 and 326) and then selects the "Run" tab from the tabs 316 to run a simulation that, in turn, outputs at least some simulation results (e.g., properties) with respect to time. In this example scenario, a geological time data structure can link to objects of a geological model such that generated simulation results can be output along a geological time axis. In such an example, the geological time data structure may be defined by a geotime object (e.g., a geotime component class) that provides input fields to store input specifications that instruct data linking or data gathering operations (e.g., via simulation, processing, etc.) to structure data in output fields with respect to geological time (e.g., along a geological time axis). In various examples, output fields can be filled with properties (e.g., values) associated with entities (e.g., a well, a reservoir, etc.). In an object-oriented environment, properties may be defined by property objects and entities by entity objects where, for example, a geotime object may define a data structure having at least one input field to hold an object identifier that dictates what data will populate an output field or fields. In this example, the data in the output field or fields may be presented along a geological time axis (e.g., the data structure may include one or more fields that hold a geological time or times).

An example of a data structure 340 is shown in FIG. 3 as including a task field, an object ID field, a property field, a geotime field and another field. In this example, the data structure 340 may include one or more fields for data, methods, instructions, etc. The data structure 340 may be populated, at least in part, by input from a configuration file, a GUI or other mechanism. In the example of FIG. 3, the data structure 340 may optionally provide a listing of tasks to instruct a computing system to perform various actions. Some examples of populated fields are shown in the data structure 340 of FIG. 3. Consider a scenario where a user selects an object having an object ID "54" and an associated property "P1" for output along a full range of geological time "Full" with a color scheme "Color". As another example, consider a scenario where a user selects an object having an object ID "23" and an associated property "P4" for output with respect to a specific geological time of 18 Ma where any property values are normalized "Normalize". In yet another example, consider a scenario where a user selects an object having an object ID "6" and an associated property "P2" for output with respect to Eocene times where property values are transformed to log values "Log". In an example embodiment, a data structure includes an input field to specify an object of a geological model, a geological time field to specify one or more geological times (e.g., a specific time or a range of times) and an output field to hold data for presentation with respect to a geological time (e.g., with respect to a geological time axis). Such a data structure can link objects of a geological model to geological times. By linking an object of a geological model to a geological time and generating simulation results for the geological model, such a data structure can facilitate outputting simulation results along a geological time axis. The GUI 310 may also include graphical controls 330, for example, to allow for issuance of basic operations such as "Apply", "OK", and "Cancel".

In the example of FIG. 3, the method 350 includes a provision block 352 for providing a geological time data structure configured to link objects of a geological model to geological times; a linkage block 354 for linking one of the objects of the geological model to one of the geological times; a generation block 356 for generating simulation results for the geological model; and an output block 358 for, based at least in part on the geological time data structure, outputting at least some of the simulation results along a geological time axis.

The method 350 is shown in FIG. 3 in association with various computer-readable media (CRM) blocks 353, 355, 357 and 359. Such blocks generally include instructions suitable for execution by one or more processors (or cores) to instruct a computing device or system to perform one or more actions. While various blocks are shown, a single medium may be configured with instructions to allow for, at least in part, performance of various actions of the method 350.

In an example embodiment, one or more computer-readable media can include computer-executable instructions to instruct a computing system to: instantiate a geological time object configured to provide a geological time axis; link property data of a geological model to geological times of the geological time axis of the instantiated geological time object; and structure the linked property data with respect to the geological time axis in a screen renderable format. For example, the CRM 353 may provide instructions for instantiating a geological time object, the CRM 355 may provide instructions for linking property data of a geological model to geological times of the geological time axis of the instantiated geological time object, and the CRM 359 may provide instructions to structure the linked property data with respect to the geological time axis in a screen renderable format. In an example embodiment, computer-executable instructions may be provided to instruct a computing system to exchange data between an object of a geological model and a geological time object, which may optionally occur during a simulation or other computing process.

Figure 4:
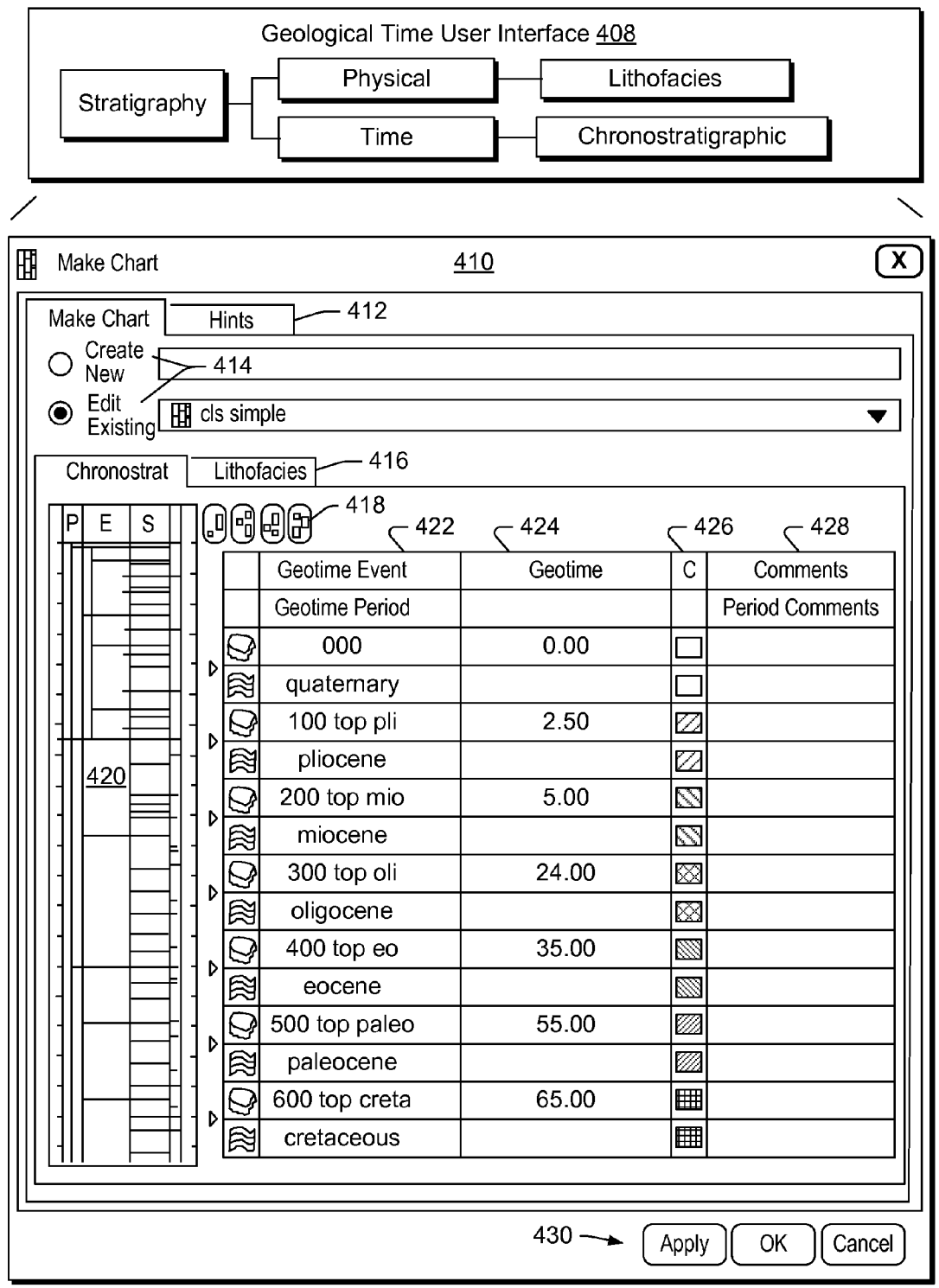
FIG. 4 illustrates an example of a graphical user interface that provides for linking time and spatial information.

FIG. 4 shows an example of a geological time user interface component 408, for example, configured to provide for rendering of an interface or GUI 410. In the example of FIG. 4, the GUI 410 includes tabs 412 for making a chart and for providing hints (e.g., access to one or more help files to assist a user). The "Make Chart" tab includes graphical controls 414 to select chart creation or loading and editing of an existing chart. A drop down control may allow for ready access to previously created charts, for example, consider a chart entitled "cls simple".

The GUI 410 also includes tabs 416 for chronostratigraphic selections and for lithofacies selections (e.g., associated facies, lithology, petroleum systems element, etc.). As shown in the example of FIG. 4, the chronostratigraphic tab includes a series of selectable configuration graphics 418 and a chronstratigraphic graphic 420, which may be configured and rendered in response to selection of one of the graphics 418.

As indicated, a so-called chart may be created or loaded. In FIG. 4, the chart "cls simple" is loaded and available for editing. The chart includes various fields such as geotime events 422, geotimes 424, colors 426 and comments 428. For each geotime 424 (e.g., 0 Ma, 2.5 Ma, 5 Ma, 24, Ma, 35 Ma, 55 Ma and 65 Ma), an associated event is shown, for example, as an entity, which may be a spatial layer or surface. To facilitate analysis, the color field 426 allows a color to be assigned to each of the events. A series of graphic controls 430 allow a user to instruct the GUI 410 to apply edits, entries, selections, etc.; to "OK" edits, entries, selections, etc., for saving to memory (e.g., a file); and to cancel edits, entries, selections, etc. Through the GUI 410, a user may create or edit a chart that provides fields for explicitly linking geological objects to geological time. Further, graphical properties may be assigned such as color to allow for enhanced visuals when information is rendered to a screen. As such a GUI may be part of an analysis or, more generally, a workflow, the comment field 428 allows a user or users to enter comments, which may be helpful to assess or engineer solutions associated with an environment, a reservoir, etc.

Figure 5:
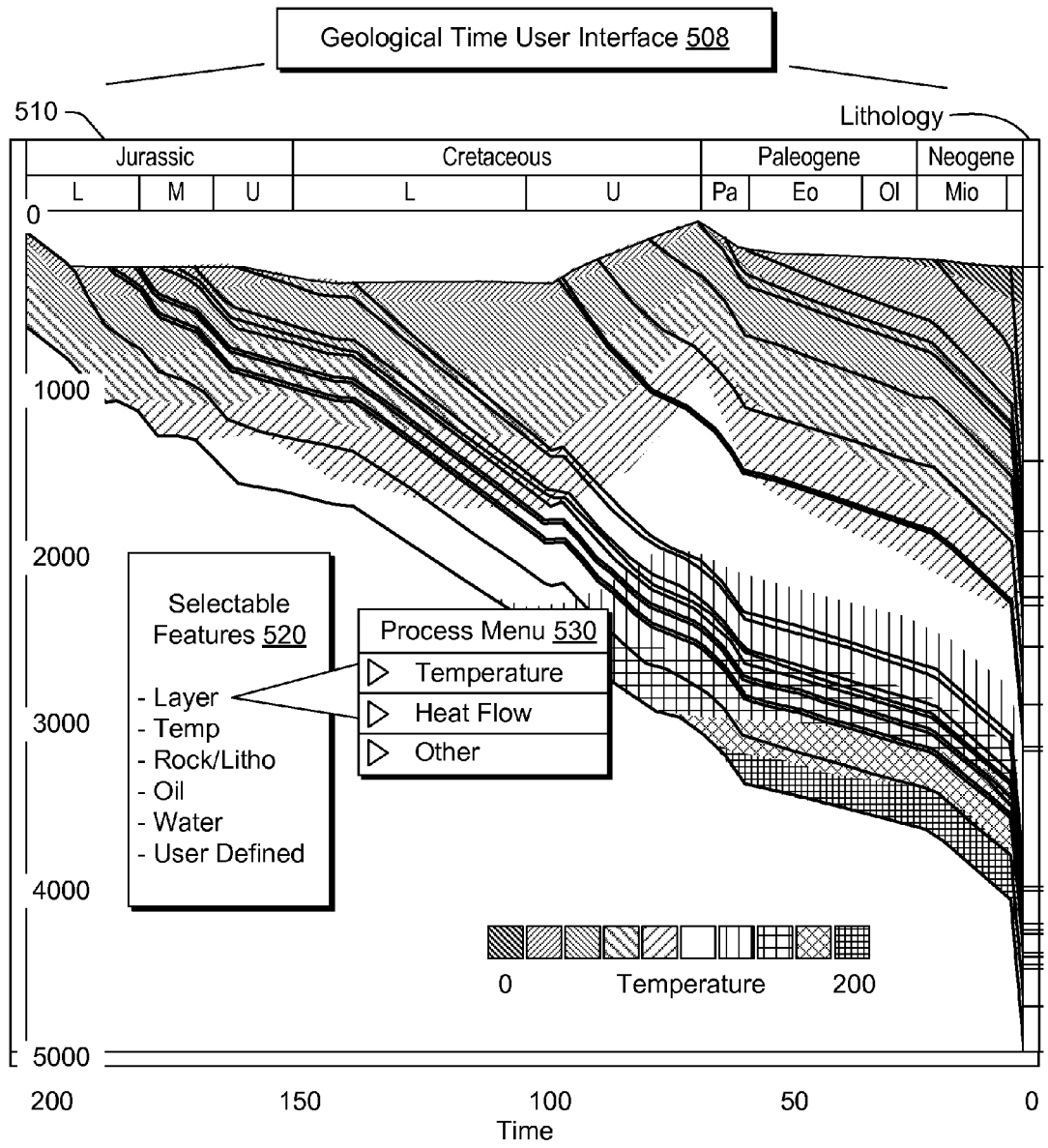
FIG. 5 illustrates an example of a graphical user interface that provides for selection of features and optionally processing of selected features along with an example of a method.
Figure 5:
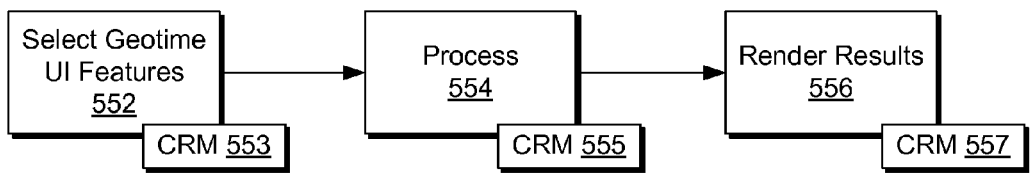

FIG. 5 shows an example of a geological time user interface component 508, for example, configured to provide for rendering of an interface or GUI 510 and also shows an example of a method 550. In an example embodiment, a GUI may be configured with selectable features that optionally provide for rendering of menus of related options. For example, the GUI 510 includes a listing of selectable features 520 where, upon receipt of a selection instruction, the GUI 510 renders a menu graphic 530 to a screen.

In the example of FIG. 5, the GUI 510 includes a geological time axis and a depth axis along with layer boundary lines, temperature contours and a lithology graphic (e.g., for lithology of various layers). In the example of FIG. 5, temperature contours are indicated by hatching, however, these may be presented in colors, shadings, or other form. Further, lithology may be presented, for example, via patterns. As an example, consider colored temperature contours and lithology patterns that allow a user to examine associations between temperature and lithology.

In the example of FIG. 5, the list of selectable features 520 indicates that the GUI 510 is configured with instructions for selection of one or more layers, a temperature or temperature range, rock or lithology properties, oil, water or one or more user definable features. As an example, upon receipt of an instruction that indicates a layer has been selected, the GUI 510 may call for rendering of the menu 530. As shown in the example of FIG. 5, the menu 530 provides for additional analysis options such as temperature, heat flow or other.

As indicated by the method 550, a selection block 552 may provide for selection of UI features, a process block 554 may provide for processing responsive to a selection and a render block 556 may provide for rendering results responsive to completion or at least partial completion of processing. For example, a user may select a layer, select a heat flow and then instruct processing to produce results for rendering to a display or screen (e.g., according to data structure provided by a geotime object).

The method 550 is shown in FIG. 5 in association with various computer-readable media (CRM) blocks 553, 555, and 557. Such blocks generally include instructions suitable for execution by one or more processors (or cores) to instruct a computing device or system to perform one or more actions. While various blocks are shown, a single medium may be configured with instructions to allow for, at least in part, performance of various actions of the method 550.

Figure 6:
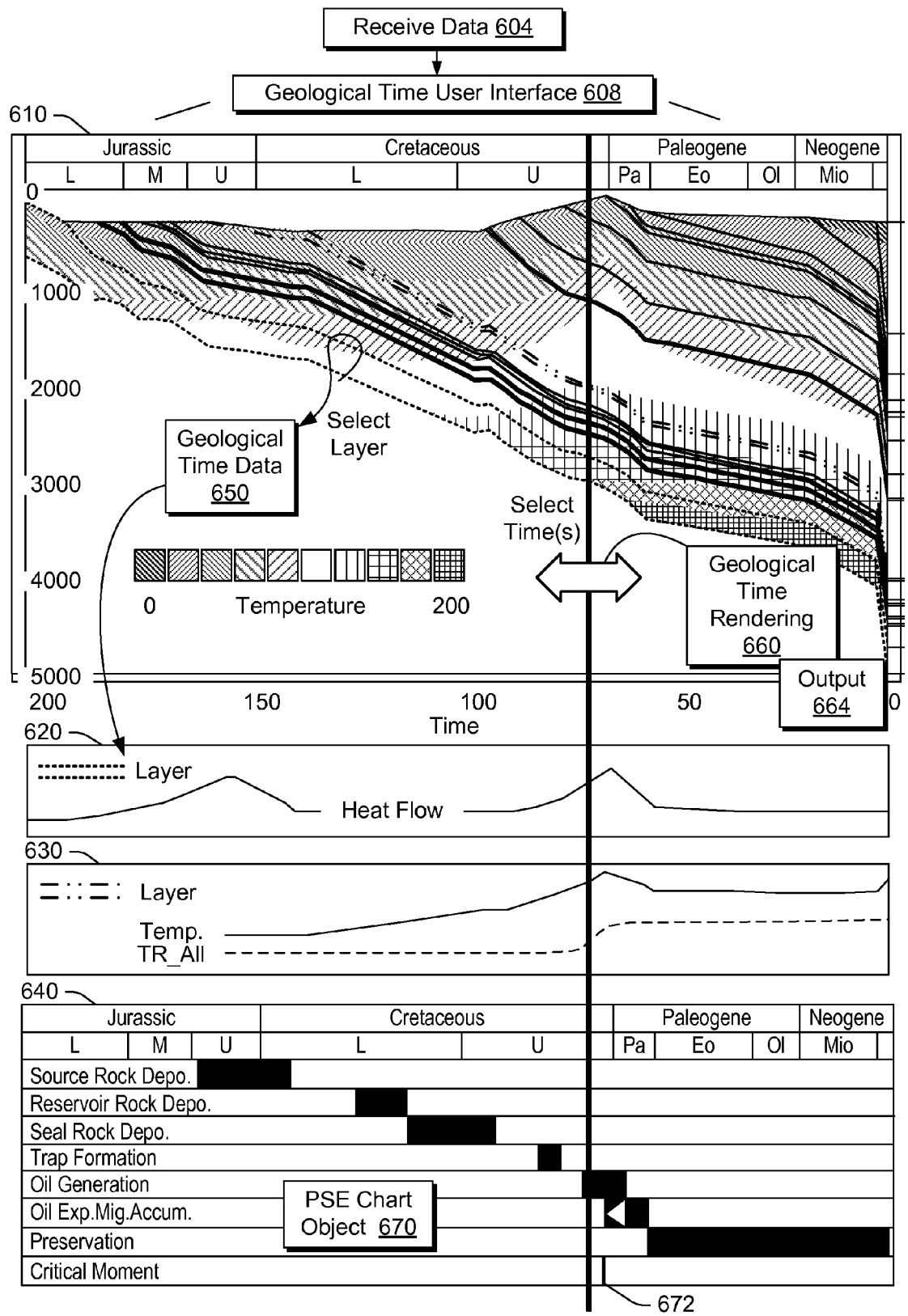
FIG. 6 illustrates an example of a graphical user interface that includes a graphical control tool to select time.

FIG. 6 shows an example of a geological time user interface component 608, for example, configured to provide for rendering interfaces or GUIs 610, 620, 630, and 640. As shown, a reception block 604 can provide the component 608 with data, which may be data from simulation (e.g., simulation results), measurements, sensing, etc. (e.g., optionally a combination of actual and simulated data). FIG. 6 also shows a geological time data component 650, a geological time rendering component 660 and a petroleum systems event chart object 670. In an example embodiment, coupled plots may be configured to zoom and pan together (e.g., to show the same time-range). In such a manner, a user can evaluate data for any desired time-range within a given geological history.

In the example of FIG. 6, the geological time data component 650 includes instructions to access data associated with the selected layer for processing to allow for rendering of the GUI 620. As indicated in the GUI 610, the selected layer spans the entire geological time axis and therefore the GUI 620 renders heat flow data for this entire period of time. In contrast, for another selected layer associated with the GUI 630, the temperature and additional plotted information extend from the geological origination time for that layer. Accordingly, in an example embodiment, upon selection of an object or feature, a geological time data component may access geological time data associated with that object or feature to provide for rendering along a geological time axis. Such an approach can be implemented in conjunction with the petroleum system events chart object 670, which associates events with features. In the example of FIG. 6, a "critical" moment 672 can be discerned on the basis of associating events and features.

With respect to petroleum system elements (PSE), temporal aspects can include, for example, depositional or formation ages, "critical" moment, and preservation time. In a PSE analysis, a "critical" moment is the time that best depicts the generation—migration—accumulation of hydrocarbons in a petroleum system and preservation time of a petroleum system begins immediately after the generation—migration—accumulation process occurs and may extend to the present day.

A PSE chart may be arranged according to an ideal or successful order of events. For example, the source rock could be generated and expel hydrocarbons once the trap is formed. With a PSE chart, one can readily check the order of events if they are arranged according to an ideal order (or successful order). In an example embodiment, a PSE chart may serve as a basis for risk analysis or be transformed into a risk chart, for example, to better evaluate a play or prospect. As an example, decisions from a risk chart analysis may be entered via a GUI and support management decisions on bidding, drilling, etc.

In an example embodiment, a method can include outputting at least some of the simulation results along a geological time axis (e.g., in Ma) and at least some of the simulation results along another axis, which may be, for example, an orthogonal axis, a log axis, a depth axis, a temperature axis, a heat flow axis, and a hydrocarbon generation axis. As shown in the example of FIG. 6, a method can include outputting (e.g., based at least in part on simulation results), petroleum systems events along a geological time axis, which may include a critical moment indicated along the geological time axis. In an example embodiment, a method can include providing a graphical user interface slider tool configured for selection of a time along a geological time axis and for output of information associated with the selected time, which may be a range of times. As explained, where various graphics are to be rendered to a screen, manipulation of a tool may provide for synchronous changes in the various graphics (e.g., to a selected time or range of times). In an example embodiment, a method can include providing a graphical user interface tool configured for selection of a spatial geographical feature. Such a tool may optionally provide for selection of the same feature across multiple graphics (e.g., in various windows, etc.).

In an example embodiment, a geological time data structure may be a geological time object (e.g., a "geotime" object). A method may include exchanging data between a spatial geological object (e.g., of a reservoir model) and a geological time object. In an example embodiment, such a method may exchange data by issuing at least one application programming interface call and receiving data in response to the call. Where a simulation occurs to generate simulation results, exchanging data may occur at least in part during generation of the simulation results. With respect to output, a method can optionally include issuing at least one control command to control resource exploration or recovery equipment associated with a physical reservoir.

In the example of FIG. 6, the GUI 610 shows a burial history plot, the GUI 620 shows a first time plot, the GUI 630 shows a second time plot and the GUI 640 shows a PSE chart. In this example, the GUIs 610, 620, 630 and 640 are coupled to show a common time range. Color and other annotations applied to one of the plots may be applied one or more other plots to enhance visualization. The geological time rendering component 660 may be configured to select a time or times (e.g., a range of times) to act as a geo-time slider that can be used to control other components for output of information, as indicated by an output block 664. Such components may be a 3D component for output of information as a 3D plot, a depth extraction tool component for presentation of burial history, etc.

In an example embodiment, one or more computer-readable media can include computer-executable instructions to instruct a computing system to: receive simulation data from a geological model-based simulation (see, e.g., the block 604); generate a simulation data plot along a geological time axis and a geological spatial axis (see, e.g., the block 608); generate a graphical control tool configured to select a time along the geological time axis (see, e.g., the block 660); and generate output information responsive to selection of a time by the graphical control tool (see, e.g., the block 664). As mentioned, a graphical control tool may allow for selection of a time range along the geological time axis. In an example embodiment, a computing system can include a communication interface to communicate output information (e.g., responsive to interaction(s) with a GUI) to control resource recovery equipment associated with a physical reservoir. As shown in the example of FIG. 6, the geological time data component 650 can include instructions for a graphical control tool configured to select a geological spatial feature of a plot (e.g., one or more layers, etc.). As to receipt of data (e.g., per the block 604), such data can include simulation data received from a geological model-based simulation, for example, where the data is accessed from a stored geological time object that includes a link to a spatial geological object.

Figure 7:
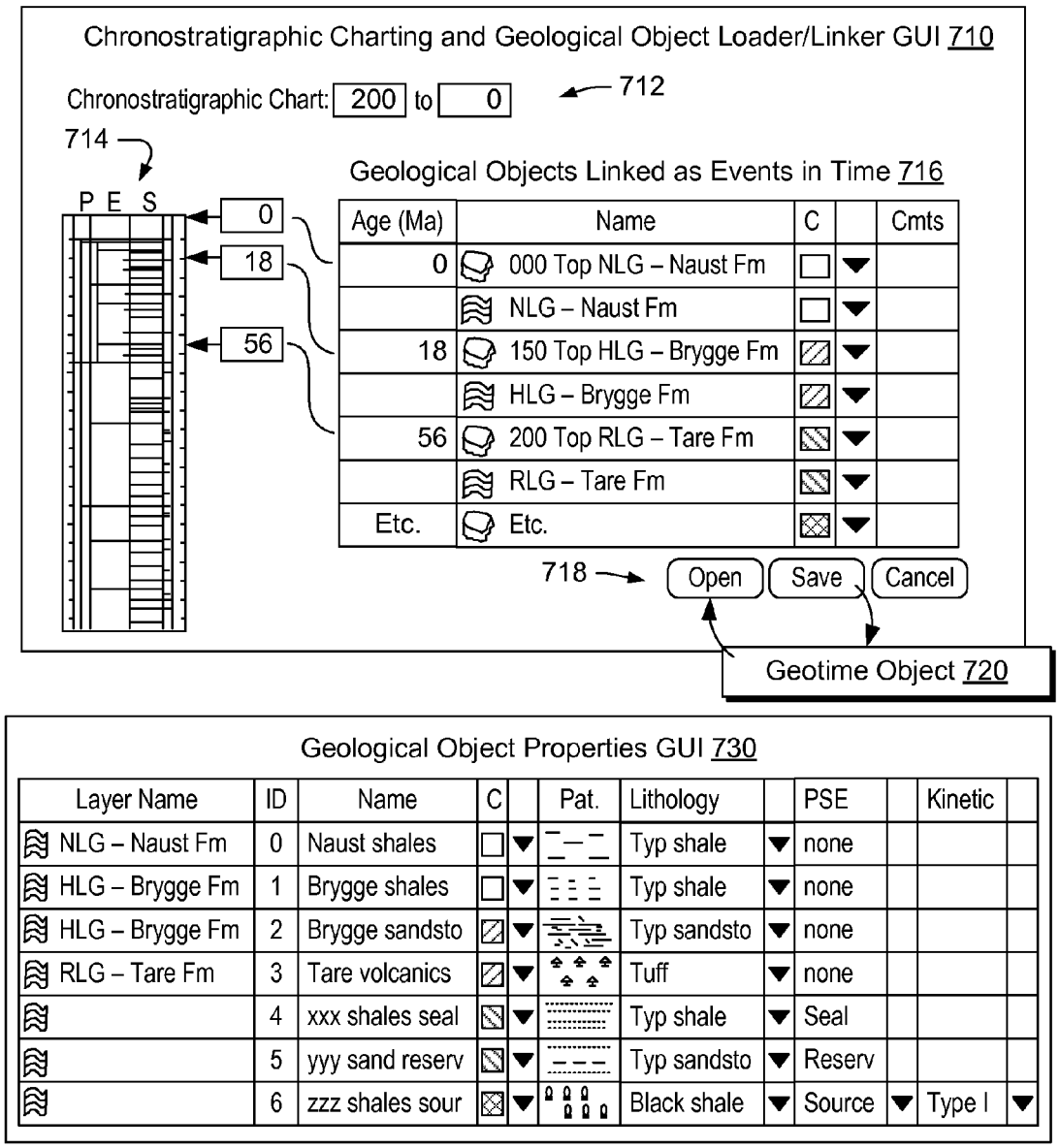
FIG. 7 illustrates examples of graphical user interfaces associated with one or more geological time objects.
Figure 7:
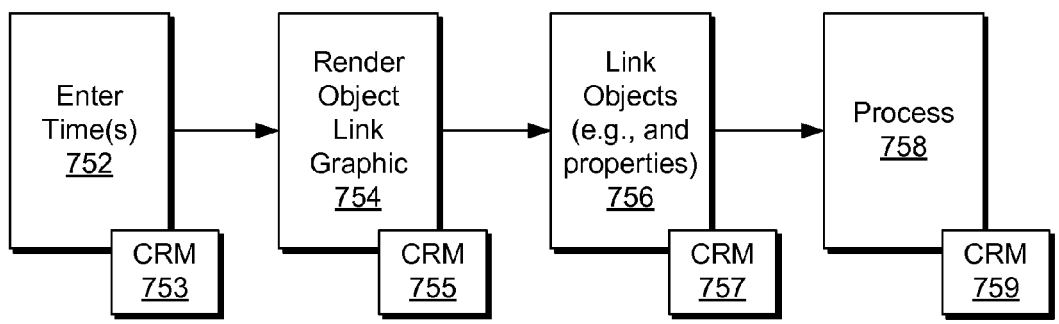

FIG. 7 shows examples of graphical user interfaces 710 and 730 and an example of a method 750. In an example embodiment, a GUI or GUIs may be rendered through use of one or more components (e.g., modules, objects, etc.) implemented via a computing system having one or more processors and memory. As shown in FIG. 7, the GUI 710 includes input fields 712 for generation of a chronostratigraphic chart 714, a table 716 configured for interaction with the chart 714 to present geological objects linked as events in time, and various controls 718, for example, to allow for opening and saving a geotime object 720. In an example embodiment, the geotime object 720 may be a data structure configured to store or provide access to information (e.g., via linking references) such as the information presented in the table 716. In general, features of the GUI 710 may allow a user to input instructions (e.g., via an input device such as a mouse, a keyboard, a touchscreen, etc.) to link geological objects as events in time.

As shown in FIG. 7, the geological object properties GUI 730 may present information in a table format that includes fields such as layer name, name and characteristics of a stratigraphic unit (e.g., "Naust Formation shales", "Brygge Formation shales", etc.), color assignment, pattern assignment, lithology, PSE, and kinetics. In an example embodiment, such properties, or others, may be stored with respect to a geotime object (e.g., the geotime object 720), which may be a GUI component accessible by a rendering component to render such information to a screen (see, e.g., the GUIs of FIG. 6), optionally with graphic controls for selecting colors, patterns, names, etc.

As shown in FIG. 7, the method 750 includes a time entry block 752 for entering one or more times, a render block 754 for rendering a geological object link graphic, a link block 756 for linking geological objects to times and optionally properties, and a process block 758 for processing linked information, for example, to generate output (e.g., graphics, charts, control commands, etc.).

The method 750 is shown in FIG. 7 in association with various computer-readable media (CRM) blocks 753, 755, 757, and 759. Such blocks generally include instructions suitable for execution by one or more processors (or cores) to instruct a computing device or system to perform one or more actions. While various blocks are shown, a single medium may be configured with instructions to allow for, at least in part, performance of various actions of the method 750.

Figure 8:
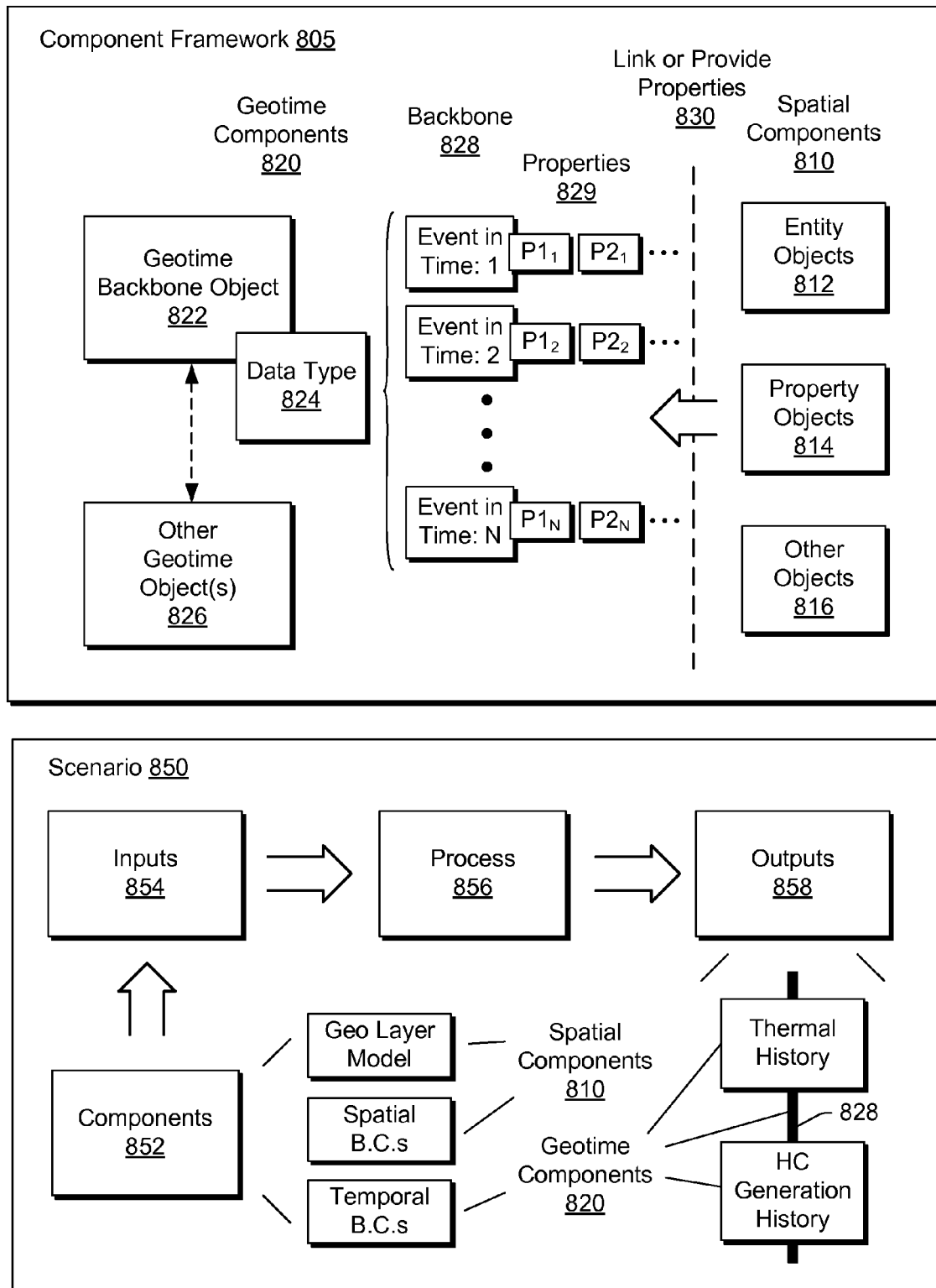
FIG. 8 illustrates an example of a component framework and an example of a scenario implementing the framework.

FIG. 8 shows an example of a component framework 805 and an example of a scenario 850 that may rely on one or more components of the framework 805. As shown, the framework 805 includes spatial components 810 and geotime components 820 that include a geotime backbone object 822 to provide a backbone 828, one or more other geotime objects 826 (e.g., objects that specify geological times, helper objects for display formatting, helper objects for analyzing data with respect to geological time, etc.) as well as a mechanism 830 for linking or providing properties 829 from the spatial components 810 to the backbone 828 (e.g., via the geotime backbone object 822). In the example of FIG. 8, the one or more other geotime components 826 may provide properties that can be readily associated with the backbone object 822 (e.g., properties already having time information). In the example of FIG. 8, each of the specified properties P1, P2, . . . PN may provide data or a set of data, for example, where each of $P1_1$, $P1_2$, $P2_1$, $P2_2$, . . . $P1_N$ and $P2_N$ may represent a value (e.g., temperature, pressure, etc.) for each event in time of the backbone 828.

In the example of FIG. 8, a linking mechanism may be provided to link or provide properties where such a mechanism may rely on one or more application programming interfaces (APIs). For example, a framework may provide for use of templates written in a domain specific language or other form. Upon consumption of the template, a GUI may be rendered with controls that conform to one or more APIs. In turn, upon selection of a control, an API call may be issued to a data store with information about spatial components. A GUI may provide for selection of one of the spatial components and, upon selection, issuance of an API mediated instruction to link or tag that spatial component as being assigned to a geotime object such as the backbone object 822. Such linking or tagging of the spatial component may be considered an indirect manner for ultimately accessing underlying data (e.g., property data).

Alternatively, or additionally, a GUI may allow for direct linking or tagging to property data. For example, consider a control that presents data storage locations for property data where a link may be established directly to such data. In such an example, a time backbone may be rendered with appropriate data without a need for an instance of the corresponding property object.

In the example of FIG. 8, the spatial components 810 may include entity objects 812, property objects 814 and optionally other objects 816. In an example embodiment, the entity objects 812 provide for geometrically representing wells, surfaces, layers, reservoirs, etc., while the property objects 814 may provide for property values as well as display parameters. For example, an entity object may represent a layer where a property object provides lithology information.

As to the geotime components 820, the geotime backbone object 822 may be defined as a data type 824 that may include a series of events through time to thereby provide the backbone 828 (see, e.g., the object backbone 283 of FIG. 2). For example, where organized as a series of events through time, the mechanism 830 may provide for linking each time event in the series to an identifier or identifiers (e.g., a name or names) for one or more spatial components 810. As to the one or more other geotime objects 826, each of these may include time information already associated with properties (e.g., values), which readily allow for handling by the geotime backbone object 822.

In an example embodiment, properties can be assigned to a geotime object where the properties may be spatial properties or optionally other properties. Accordingly, in the framework 805, the geotime backbone object 822 can be linked to one or more of the objects 812, 814, 816, or 826. In such a scheme, property values may be aligned with respective geotime events to provide resolution in time akin to resolution in space. Further, the one or more other geotime objects 826 may optionally be types of objects, for example, to assist with GUIs, linking, rendering, output, etc.

In an example embodiment, a geotime object may also provide for specifying input as well as specifying output from the perspective of a certain simulation or calculation module. For example, to enable selection and assignment by a user as well as to define receipt of input by one or more workflows, transmission of output may occur to one or more workflows, etc. In such a manner, a geotime object can provide for coupling of components.

In the scenario 850, the components 852 provide inputs 854 for a process 856, which, in turn, provides outputs 858. As an example, consider a 1D petroleum system simulation that includes a geological layer model and some spatial boundary conditions as well as temporal boundary conditions (e.g., heat flow, sediment water interface temperature and paleo water depth). In such an example, the geological layer model and boundary conditions components 852 may be a mix of spatial components 810 and geotime components 820 that can be inputs 854 that carry various data used for the process 856, such as a simulation (see, e.g., the example GUI 310 of FIG. 3 "Make 1D Simulation"). Upon performing the process, generated results (or simulation data) may be represented by geotime components (e.g., objects and properties) to allow for rendering graphics to a display (e.g., thermal history, hydrocarbon-generation history of source rock, etc.). In an example embodiment, output objects may serve as input for any of a variety of purposes, for example, a prospect evaluation module or any other geological interpretation tool.

The scenario 850 can provide various options for a user to deal with geotime objects. For example, a geotime object may be loaded, saved and selected like any other object in a data structure provided by a modeling or other framework (e.g. consider PETREL® input tree) where, for example, concepts of assigning properties and semantic schemes (e.g., consider PETREL® templates) can be provided to geotime objects in a manner akin to spatial objects.

Figure 9:
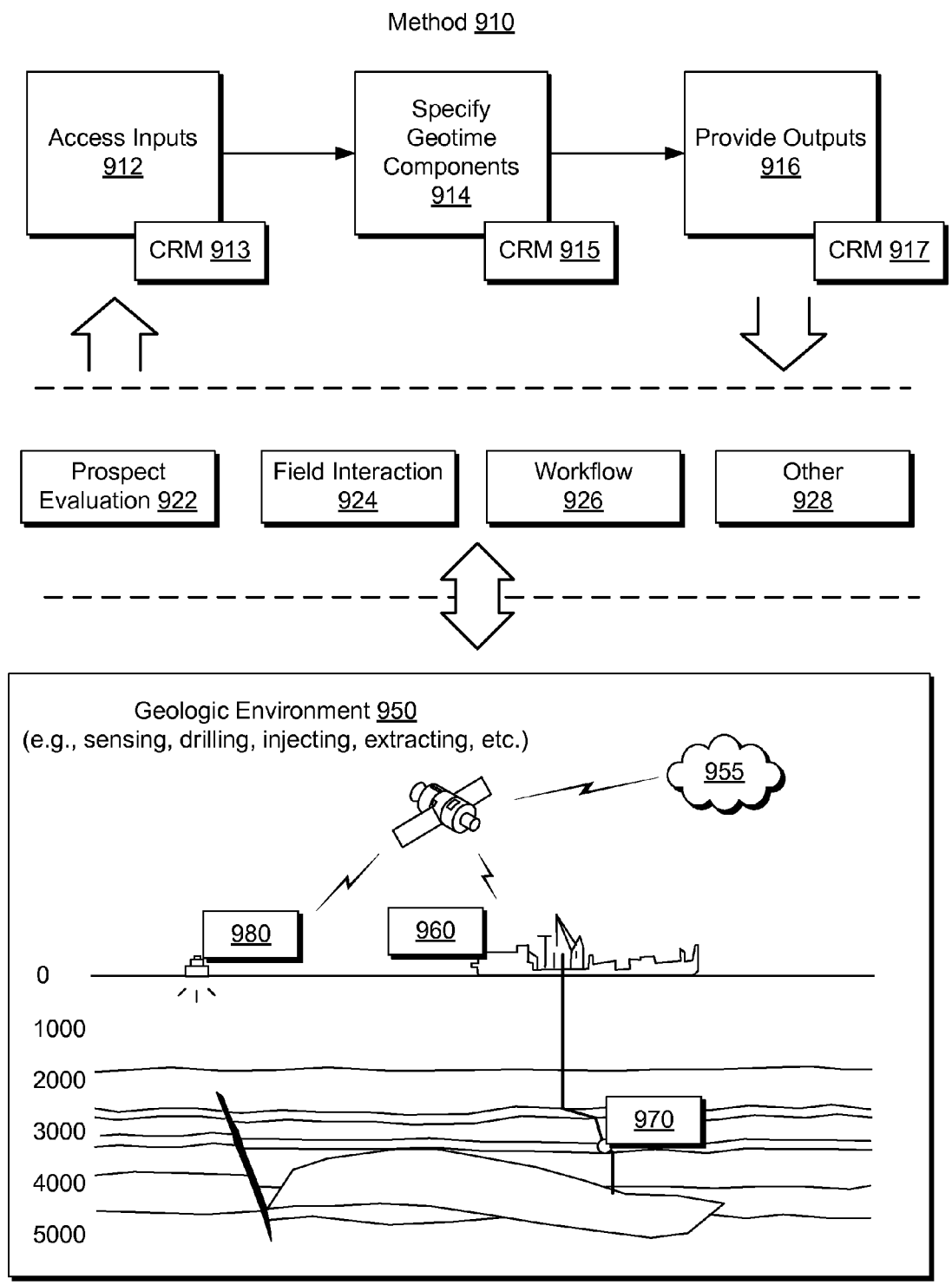
FIG. 9 illustrates an example of a method for inputting and outputting information, optionally from or to field equipment.

FIG. 9 shows an example of a method 910 that includes an access block 912 for accessing inputs (e.g., sources of input information), a specification block 914 for specifying one or more geotime components and an output block 916 for outputting information. The method 910 is shown in FIG. 9 in association with various computer-readable media (CRM) blocks 913, 915 and 917. Such blocks generally include instructions suitable for execution by one or more processors (or cores) to instruct a computing device or system to perform one or more actions. While various blocks are shown, a single medium may be configured with instructions to allow for, at least in part, performance of various actions of the method 910.

As shown in the example of FIG. 9, the method 910 can receive input from or provide output to a prospect evaluation 922, a field interaction 924, a workflow 926 or other process 928. Such processes may be associated with a geologic environment 950, which may include a communication network 955 configured to communicate information from equipment such as a computing device or system to the environment 950. Accordingly, the access block 912 may access input from the environment 950 and the output block 915 may provide for output to the environment 950. Output to the environment 950 may be in the form of issued control commands to control equipment such as resource exploration or recovery equipment 960, 970 and 980.

In an example embodiment, one or more computer-readable media may include computer-executable instructions to instruct a computing system to output information for controlling a process. For example, such instructions may provide for output to sensing process, an injection process, drilling process, an extraction process, etc.

Figure 10:
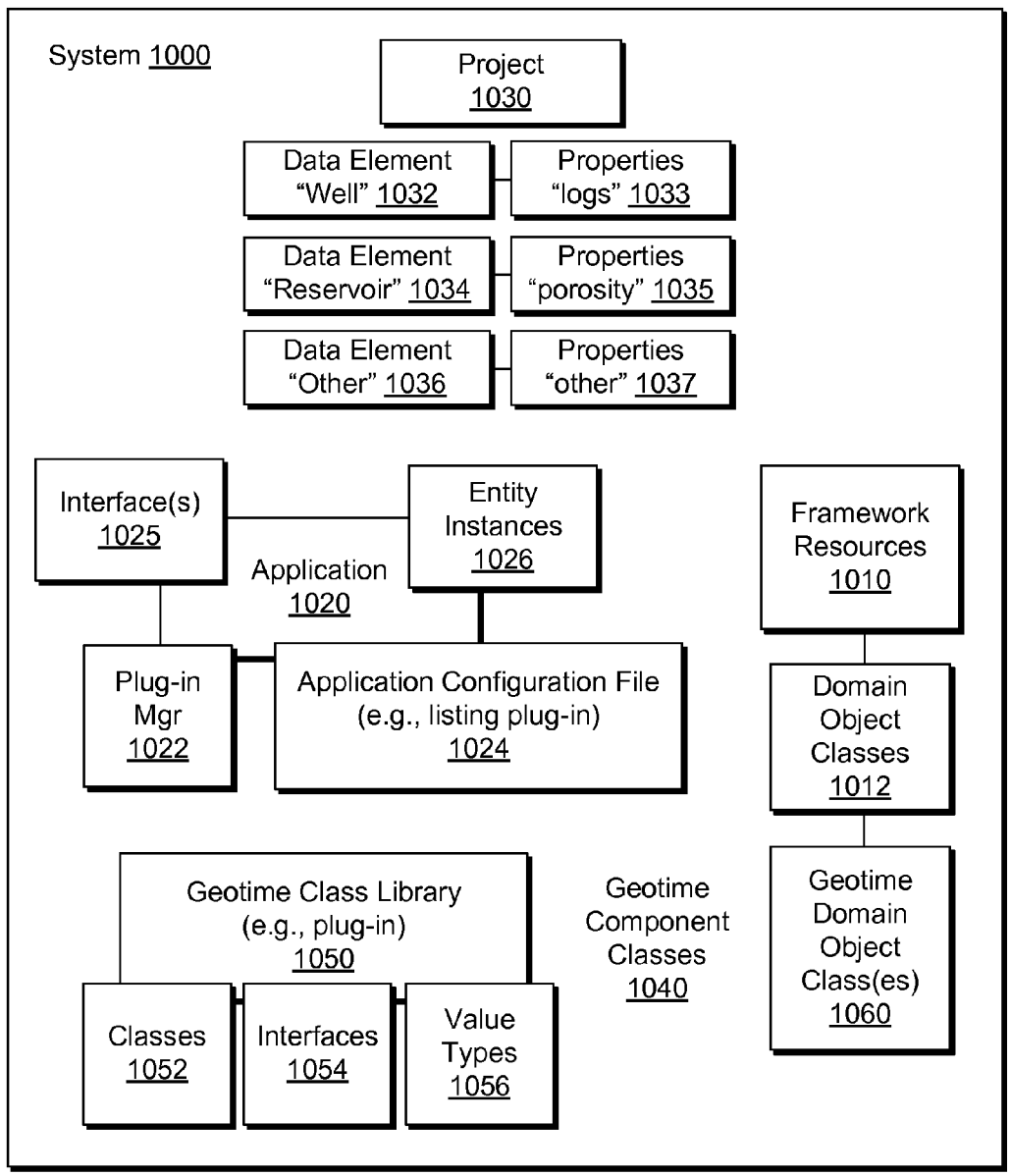
FIG. 10 illustrates an example of a system with optional custom features and an example of a method.
Figure 10:
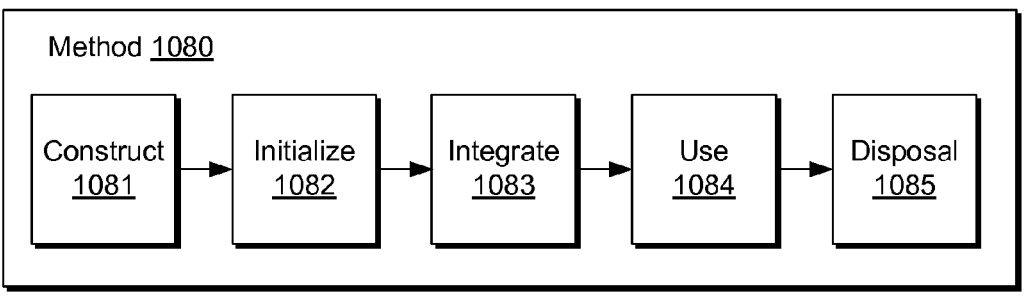

FIG. 10 shows an example of a system 1000 and an example of a method 1080. As to the system 1000, it can include framework resources 1010, an application 1020, a project 1030, and geotime component classes 1040 in the form of a geotime class library 1050, one or more geotime domain object classes 1060 or both a geotime class library 1050 and one or more geotime domain object classes 1060.

In the example of FIG. 10, the application 1020 can include a plug-in manager 1022, an application configuration file 1024, one or more interfaces 1025 and entity instances 1026. An entity instance may carry geometry of an entity object it represents where a property object carries property values associated with that entity. For example, the project 1030 includes a data element for a well 1032, a data element for a reservoir 1034 and a data element for another feature 1036. In such an example, the data elements 1032, 1034 and 1036 represent entities that are characterized by corresponding properties such as log values 1033, porosity values 1035 and other values 1037. These types of data (e.g., entity and property) may be exposed via domain object classes 1012 of the framework resources 1010, as implemented by the application 1020.

In the example of FIG. 10, the geotime component classes 1040 may be one or more geotime domain object classes 1060, and, for a project, a geotime data element may exist that is exposed via one or more of the geotime domain object classes 1060. In such a scenario, the project may further include properties associated with the geotime data element where the properties may be exposed via one or more of the geotime domain object classes 1060. For example, the data element 1036 may be a geotime backbone entity and the properties 1037 may be values that include time information (e.g., heat flow values with associated times). The application 1020 may instantiate the geotime backbone entity to be one of the entity instances 1026 and render it as one of the interfaces 1025.

In the example of FIG. 10, geotime component classes may be provided via the geotime class library 1050, for example, in the form of plug-ins. As shown, the library 1050 may include classes 1052, interfaces 1054 and value types 1056. The application 1020 may allow for use of the library 1050 via the plug-in manager 1022 that accesses the application configuration file 1024. In such an arrangement, the plug-in manager 1022 may allow for registration and use of the library 1040.

As shown in FIG. 10, the method 1080 includes a construct block 1081, an initialize block 1082, and integrate block 1083, a use block 1084 and a disposal block 1085. Such a method may provide for use of one or more plug-ins, for example, as provided by the geotime class library 1050.

In the example of FIG. 10, the framework resources 1010 may include a module interface that defines procedures (e.g., methods) such as those of the method 1080. For example, such a module interface may include methods for construction, initialization, integration, presentation integration, disintegration, and disposal of a plug-in module. Consider the following scenario where during startup of an application, a construction method may load a module as defined in the configuration file for an application and proceed to instantiate the module. Following construction, an initialization method may register any services provided by the module, which may allow for consumption of such services to one or more other modules. After initialization, an integration method can involve consumption of registered services. Where appropriate, an integrate presentation method makes user interface components (menus, toolbars, context menus, windows, etc.) available. Accordingly, a user may interact with and use functionality provided by the module. After use, for example, at shut down, a disintegration method can clean up any presentation elements installed by the module. Thereafter, a disposal method can free any unmanaged resources and free any licenses acquired by the module.

Figure 11:
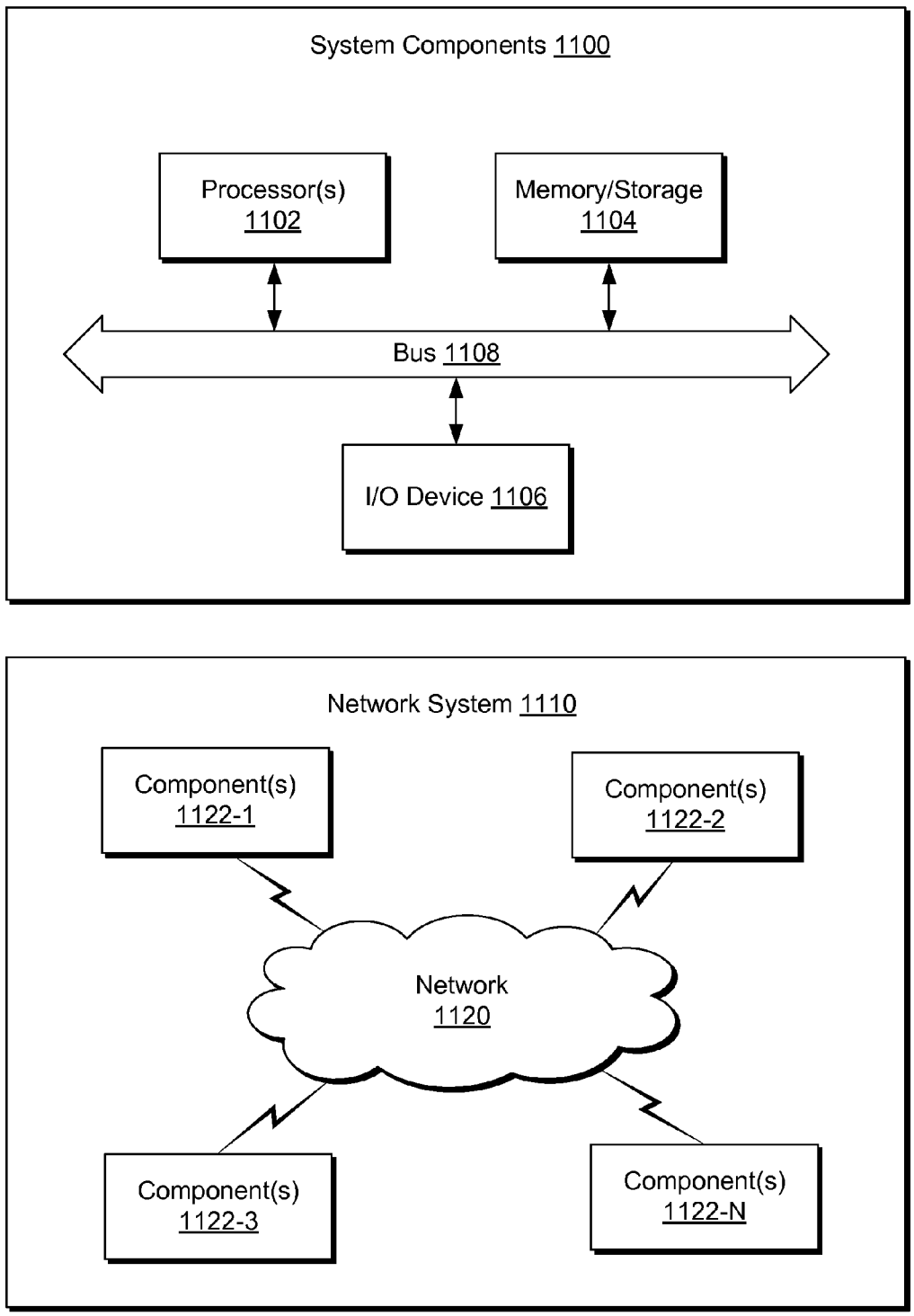
FIG. 11 illustrates example components of a system and a networked system.

FIG. 11 shows components of an example of a computing system 1100 and an example of a networked system 1110. The system 1100 includes one or more processors 1102, memory and/or storage components 1104, one or more input and/or output devices 1106 and a bus 1108. In an example embodiment, instructions may be stored in one or more computer-readable media (e.g., memory/storage components 1104). Such instructions may be read by one or more processors (e.g., the processor(s) 1102) via a communication bus (e.g., the bus 1108), which may be wired or wireless. The one or more processors may execute such instructions to implement (wholly or in part) one or more attributes (e.g., as part of a method). A user may view output from and interact with a process via an I/O device (e.g., the device 1106). In an example embodiment, a computer-readable medium may be a storage component such as a physical memory storage device, for example, a chip, a chip on a package, a memory card, etc.

In an example embodiment, components may be distributed, such as in the network system 1110. The network system 1110 includes components 1122-1, 1122-2, 1022-3, ... 1122-N. For example, the components 1122-1 may include the processor(s) 1102 while the component(s) 1122-3 may include memory accessible by the processor(s) 1102. Further, the component(s) 1102-2 may include an I/O device for display and optionally interaction with a method. The network may be or include the Internet, an intranet, a cellular network, a satellite network, etc.

CONCLUSION

Although various methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:
   executing an object-based framework that comprises
      geological objects that geometrically represent physical features associated with a geological environment and
      a geotime backbone object that temporally represents geological events in geological time;
   via the executing, rendering a graphical user interface to a display wherein the graphical user interface comprises a chart for a span of geological time;
   creating links responsive to input received via the graphical user interface wherein the links link the geological objects of the object-based framework to geological times of the chart;
   storing the links as properties of the geotime backbone object;
   accessing the geotime backbone object;
   generating representations of the geological objects linked to geological times within the span of geological time based on the accessed geotime backbone object; and
   rendering the graphical user interface to a display wherein the graphical user interface comprises the chart for the span of geological time and the representations of the geological objects linked to geological times within the span of geological time.

2. The method of claim 1 wherein the geological objects comprise a geological object that represents a physical feature that corresponds to a geological event.

3. The method of claim 1 wherein the geological objects comprise a geological object that represents a spatial layer.

4. The method of claim 1 wherein the geological objects comprise a geological object that represents a surface.

5. The method of claim 1 further comprising receiving a comment for one of the geological objects and storing the comment as a property of the geotime backbone object.

6. The method of claim 1 further comprising associating a color with one of the geological objects and storing the color as a property of the geotime backbone object.

7. The method of claim 6 comprising instantiating the geotime backbone object and rendering a visualization with respect to at least a portion of the span of geological time based at least in part on the one geological object wherein the visualization comprises the color associated with the one geological object.

8. The method of claim 6 wherein each of the geological objects comprises a different associated color.

9. The method of claim 1 comprising
creating additional links responsive to input received via the graphical user interface wherein the additional links link additional geological objects to geological times of the chart, and
storing the additional links as properties of the geotime backbone object.

10. One or more non-transitory computer-readable media comprising computer-executable instructions to instruct a computing system to:
instantiate an object-based framework that comprises geological objects that geometrically represent physical features associated with a geological environment and a geotime backbone object that temporally represents geological events in geological time;
render a graphical user interface to a display wherein the graphical user interface comprises a chart for a span of geological time;
create links responsive to input received via the graphical user interface wherein the links link geological objects of the object-based framework to geological times of the chart;
store the links as properties of the geotime backbone object;
access the geotime backbone object;
generate representations of the geological objects linked to geological times within the span of geological time based on the accessed geotime backbone object; and
render the graphical user interface to a display wherein the graphical user interface comprises the chart for the span of geological time and the representations of the geological objects linked to geological times within the span of geological time.

11. The one or more non-transitory computer-readable media comprising computer-executable instructions of claim 10 wherein the geological objects comprise at least one member selected from a group consisting of a physical feature that corresponds to a geological event, a geological spatial layer, and a geological surface.

12. The one or more non-transitory computer-readable media comprising computer-executable instructions of claim 10 further comprising instructions to receive a comment for one of the geological objects and to store the comment as a property of the geotime backbone object.

13. The one or more non-transitory computer-readable media comprising computer-executable instructions of claim 10 further comprising instructions to associate a color with one of the geological objects and storing the color as a property of the geotime backbone object.

14. The one or more non-transitory computer-readable media comprising computer-executable instructions of claim 13 further comprising instructions to instantiate the geotime backbone object and to render a visualization with respect to at least a portion of the span of geological time based at least in part on the one geological object wherein the visualization comprises the color associated with the one geological object.

15. The one or more non-transitory computer-readable media comprising computer-executable instructions of claim 13 wherein each of the geological objects comprises a different associated color.

16. The one or more non-transitory computer-readable media comprising computer-executable instructions of claim 10 further comprising instructions to
access the geotime backbone object,
render the graphical user interface to a display wherein the graphical user interface comprises a chart for a span of geological time and representations of geological objects linked to geological times within the span of geological time,
create additional links responsive to input received via the graphical user interface wherein the additional links link additional geological objects to geological times of the chart, and
store the additional links as properties of the geotime backbone object.

17. A system comprising:
a processor;
memory;
instructions stored in the memory and executable by the processor to instruct the system to
instantiate an object-based framework that comprises geological objects that geometrically represent physical features associated with a geological environment and a geotime backbone object that temporally represents geological events in geological time;
render a graphical user interface to a display wherein the graphical user interface comprises a chart for a span of geological time;
create links responsive to input received via the graphical user interface wherein the links link geological objects of the object-based framework to geological times of the chart;
store the links as properties of a geotime backbone object;
access the geotime backbone object;
generate representations of the geological objects linked to geological times within the span of geological time based on the accessed geotime backbone object; and
render the graphical user interface to a display wherein the graphical user interface comprises the chart for the span of geological time and the representations of the geological objects linked to geological times within the span of geological time.

18. The system of claim 17 wherein the object-based framework comprises a simulation framework.

19. The system of claim 17 further comprising instructions stored in the memory and executable by the processor to access the geotime backbone object, to perform a simulation based at least in part on the properties of the geotime backbone object to generate simulation results and to create a geotime backbone object that comprises the simulation results and corresponding geological times as properties.

20. The system of claim 19 further comprising instructions stored in the memory and executable by the processor to store the geotime backbone object, to access the geotime backbone object and to render the simulation results with respect to a geological time axis based at least in part on the properties of the geotime backbone object.

* * * * *